United States Patent Office 3,198,096
Patented Aug. 3, 1965

3,198,096
PHOTOGRAPHIC CAMERAS
Heinz Köppen, Stuttgart, Germany, assignor to Zeiss Ikon Aktiengesellschaft, Stuttgart, Germany
Filed Nov. 6, 1961, Ser. No. 150,354
Claims priority, application Germany, Nov. 11, 1960, Z 8,356
22 Claims. (Cl. 95—10)

The present invention relates to a photographic camera, particularly to a single lens mirror reflex camera, designed for selectively making flash blub exposures and daylight exposures.

It is an object of the invention to provide the camera or the objective of the same with means for employing for flash bulb exposures different guide numbers and a distance adjusting means and a spring operated diaphragm which latter is caused to be automatically adjusted to the required size upon adjustment of the camera to the desired guide number and distance.

Another object of the invention is to provide the camera with a selectively employable automatic exposure device and means for rendering said flash bulb exposure mechanism inactive when said automatic exposure device is used.

Still another object of the invention is to provide said camera with means for limiting the distance adjusting means to a certain range of distances in dependence upon the adjusted guide number.

It is also an object of the invention to provide the camera with means for selectively employing a manual adjustment of the diaphragm, which means is associated with a mechanism which renders said flash bulb exposure mechanism and distance limiting means and automatic exposure device inactive when said means for manual adjustment of the diaphragm is used.

With these and other objects in view as will appear hereinafter the invention will be described in the following specification with reference to the accompanying drawings, while the scope of the invention will be defined by the appended claims.

In the drawing:

FIG. 1 illustrates diagrammatically a front elevation view of a camera objective with the various parts of the invention in one specific portion;

FIG. 1a discloses in detail a portion of FIG. 1;

FIG. 1b discloses in detail another portion of FIG. 1;

Figure 1:
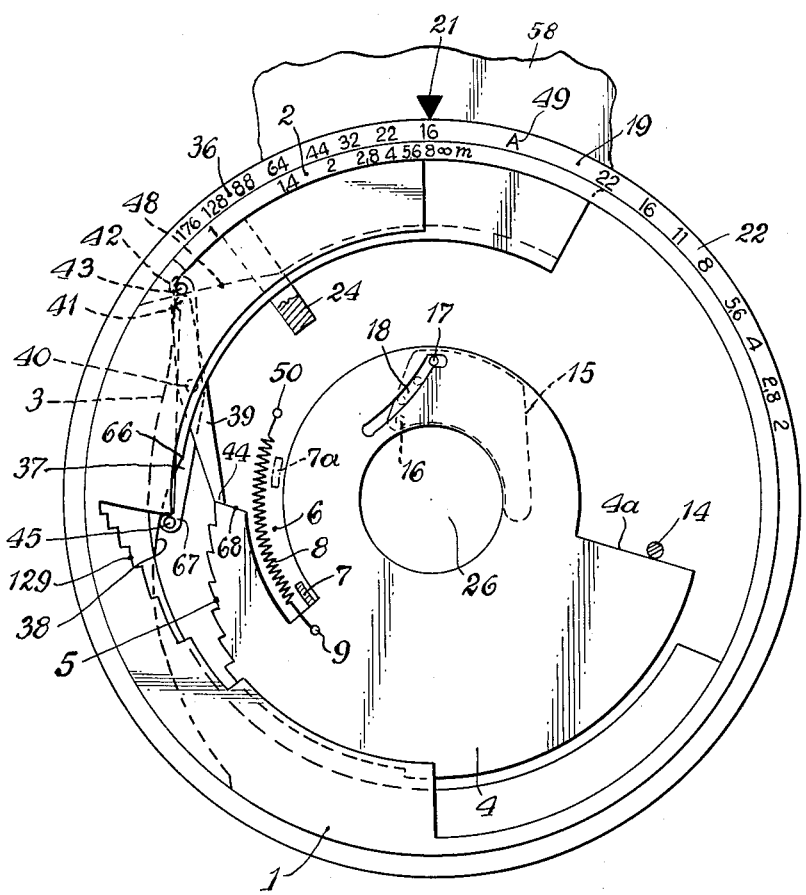
Figure 1A:
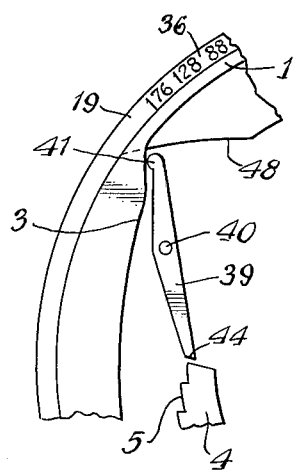
Figure 1B:
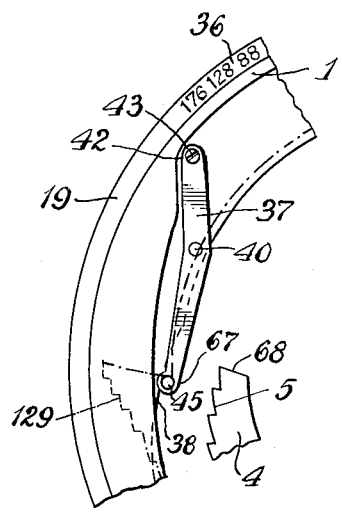

Referring to FIG. 1, the mount of the camera objective of the invention is provided with a distance adjusting ring 1 which is provided with a distance scale 2. Next to this distance adjusting ring 1 is arranged a rotatable adjusting ring 19 which is provided with a flash bulb guide number scale 36 and with a single mark 49, namely an A, indicating the range of the automatic exposure mechanism, and finally, this ring 19 carries a diaphragm scale 22 which indicates the range of the manual diaphragm selection or of preselected diaphragm values, respectively.

These rings 1 and 19, respectively the scales thereon, are brought when they are used into registration with a single stationary index 21 which is provided either on the stationary objective mount or on the camera casing. The adjusting ring 19 therefore forms at the same time the adjusting ring for the scale values and an actuating ring for switching the camera from one range of operation to another range of operation, such as for flashlight exposures or for daylight exposures.

The distance adjusting ring 1 is provided on its inner circumference with a control and compensating cam 3 which is in tracing engagement with the head 41 of a lever arrangement 37, 39, the particular purpose of which will be described in more detail hereinafter. The distance adjusting ring 1 carries also on its inner circumference a ratchet cam 129 which is employed for the automatic limitation of the distance adjustment in dependence of the selected flash bulb guide number. This ratchet cam 129 cooperates with an abutment pin 45 which is arranged on the lower end 67 of the lever 37.

The adjusting ring 19 is provided on its inner circumference with a control cam 38 which cooperates with the lower free end 67 of the lever 37. The shape of the cam 38 is designed to cause a pivotal movement of the lever 37 in dependence of the selected guide number with respect to the ratchet cam 129 on the distance adjusting ring 1. At the same time, the lever 39 which is pivotally connected with the lever 37 at 40 is caused to perform different movements and will be moved to different angles of incidence relative to a series of abutment steps 5 provided on annular diaphragm cage 4.

The adjusting ring 19 and the distance adjusting ring 1 are arranged concentrically about a rotary diaphragm cage 4 which has a central aperture 26 through which the light beam of the camera objective passes into the camera casing to expose a film therein. This diaphragm cage 4 is provided with a partially annular recess 6 which is arranged concentrically about the optical axis of the camera objective and within this recess 6 is arranged an operating member 7 which is actuated in conventional manner by the shutter tensioning and film advancing mechanism of the camera. The recess 6 also has arranged therein a helical spring 8, one end of which is attached to a stationary point 50 on the objective mount, while the other end is attached to a pin 9 on the diaphragm cage 4. When the camera is made ready for an exposure, namely when the shutter is tensioned and when at the same time therewith the film advancing mechanism is actuated, then the operating member 7 is moved from its position indicated in dash and dotted lines 7a into the position 7 and this has the result that the rotatable diaphragm cage 4 is moved against the action of the spring 8 into the position illustrated in FIG. 1 until the diaphragm cage 4 engages with a radial shoulder 4a a stationary abutment 14 arranged on some part of the stationary objective mount. Between the rotatable diaphragm cage 4 and a stationary second diaphragm cage 53 (FIG. 5), which is arranged in rear of the cage 4, are arranged the diaphragm segments of the diaphragm mechanism. FIG. 1, however, shows only one of these diaphragm segments 15. This diaphragm segment 15 is arranged rotatably about a stationary axis 16 on the second stationary diaphragm cage 53 and is provided on its other side with a control pin 17 which extends into a control slot 18 arranged in the rotatable diaphragm cage 4. FIG. 1 illustrates by a number of small circles the different positions which the control pin 17 may assume in the slot 18 of the rotatable diaphragm cage 4 when the latter is caused to be rotatably adjusted. This means that the different positions of the control pin 17 in the slot 18 correspond to different positions of the segment 15 when the latter performs opening and closing movements that control the size of the aperture through which the light enters the camera.

The rotatable diaphragm cage 4 will be arrested in the illustrated position after the camera has been tensioned, and in this position the diaphragm aperture will be the greatest. Only after the shutter of the camera has been released, the diaphragm cage 4 will be rotatably moved under the action of the spring 8 in clockwise direction and when this takes place, the operating member 7 will be released from the shutter and will jump into the position 7a. Depending upon the length of the return movement of the diaphragm cage 4, the diaphragm will be closed more or less.

As already stated, the diaphragm cage 4 is provided on a portion of its outer circumference with a series of abutment steps 5 and the latter cooperate with the lower end 44 of the lever 39 operating as a catch member in order to adjust a flash bulb arrangement provided with a spring diaphragm in dependence of the guide number and distance adjustment. The lever arrangement 37, 39 has the following features: The upper end 42 of the lever 37 is rotatable about a stationary axis 43. The lever 37 carries approximately in its center the axis of rotation 40 of the second lever 39. The lever 37 performs a pivotal movement about its axis 43 when its lower free end 67 traces the cam 38 on the actuating ring 19. As a result of this pivotal movement the guide number adjustment is transferred into the lever arrangement 37, 39, because the lever 39 attached to the lever 37 follows every movement of the lever 37. The upper free end 41 of the lever 39 is in engagement with the cam 3 on the distance adjusting ring 1. In this manner the lever 39 is moved in dependence of the adjusted distance so that its lower free end 44 may assume different angles of incidence with respect to the row of abutment steps 5 on the diaphragm cage 4. This movement and the angle of incidence of the lever end 44 are therefore determined by the guide number adjustment and the distance adjustment.

The operation of the automatic flash mechanism with the spring diaphragm and an automatic limitation of the distance in dependence of the guide number is as follows:

As already stated, the pivotal movement of the lower free end 67 of the lever 37 and therewith the position of the abutment pin 45 with respect to the distance limiting ratchet cam 129 is determined by the control cam 38 on the actuating ring 19. This cam 38 becomes effective when the flash range as indicated by the guide number scale 36 has been moved opposite the stationary index 21 and when the cam 38 is so constructed and arranged that within the range of the low guide numbers, for instance guide number 16, the angle of incidence of the abutment pin 45 with respect to the ratchet cam 129 is small and its distance from the ratchet cam is great, while at an adjusted high guide number, for instance 176, the angle of incidence of the abutment pin 45 with respect to the ratchet cam 129 is great and its distance from the ratchet cam is small. This means that when a low guide number is opposite the index 21, the entire distance range from 1 meter to 8 meters is available for a flash bulb exposure, while when a high guide number has been moved opposite the index 21 only a small distance range is available which in the smallest instance may consist only of a distance of 8 meters, while the remaining exposure range is blocked. In the first extreme condition, namely when the guide number 16 is moved opposite the index 21, there is formed at a distance of 8 meters a diaphragm $f:2$, while in the other extreme condition, namely when the guide number 176 is opposite the index 21, the diphragm $f:16$ will be formed for a distance of 1 meter. Both these diaphragm values are available at the camera or on the camera objective. In another extreme condition, when the guide number 176 is opposite the index 21, there is formed only the available distance range of 8 m. for a diaphragm aperture $f:22$ which also is available on the objective of the camera or on the camera.

The lever arrangement 37, 39 as shown in FIG. 1, upon the automatic adjustment of the diaphragm in dependence of the adjusted distance and the adjusted guide number will be set when the distance is 8 m. and the lowest guide number is 16 to such a position that the free lever end 44 acting as a catch member will be positioned directly opposite the abutment surface of the first step on the series of abutment steps 5 on the diaphragm cage 4. The formation of the diaphragm aperture in accordance with the equation $$\text{Diaphragm} = \text{Guide Number} \div \text{Distance}$$

is assured in this manner that the rotatable diaphragm cage 4 upon release of the shutter is unable to perform a rearward rotation so that the aperture remains fully open. When the camera is adjusted to shorter distances and/or higher guide numbers, then the position of the catch member 44 is changed in such a manner that its angle of incidence with respect to the abutment steps 5 is reduced and its distance from the abutment steps is increased. Therefore, the diaphragm cage 4 is able, when the camera is adjusted to shorter distances and/or higher guide numbers, to perform a rearward rotation of increased distance. In the extreme case, namely when the distance has been adjusted to the smallest value and the guide number to the highest value, the position of the lever end 44 with respect to the abutment steps 5 is such that a complete rearward rotation of the diaphragm cage 4 is possible until the lever end 44 engages the last one of the abutment steps 5. This means that the pin 17 moves into the deepest indicated position in the guide slot 18 and in this position the diaphragm segment 15 has been closed to its smallest aperture.

Figure 5:
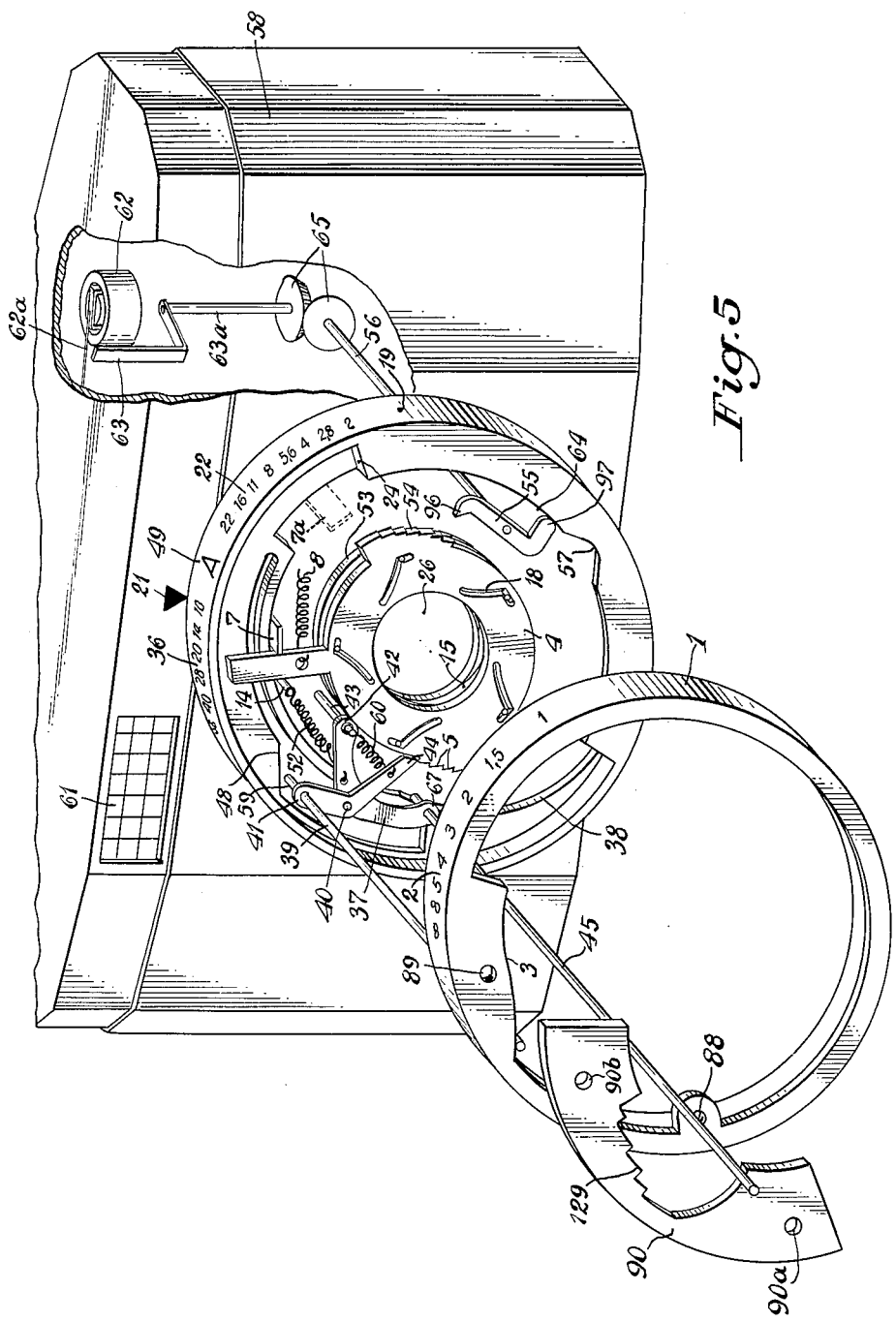
FIG. 5 illustrates an exploded perspective view of a photographic camera embodying the structure of the invention shown in FIG. 1.

In order to use the camera or the camera objective also for daylight exposures, the actuating ring 19 has to be rotated in a counterclockwise direction. This rotative movement of the ring 19 has to be performed along such a distance that the mark A indicated with 49 comes to lie below the stationary index 21 and then the camera or the camera objective operates with an exposure mechanism of which certain parts are illustrated in FIG. 5 and will be described in connection with this figure.

If, however, the adjusting ring 19 is moved still farther in counterclockwise direction, another one of the numbers of the diaphragm scale 22 comes to lie directly below the index 21 and the camera or the camera objective operates then as a conventional exposure device with manual selection of the diaphram. In order to assure both of these additional operating possibilities, it is of course necessary that the described automatic flash bulb mechanism with said spring diaphragm and blocking arrangement for the distance adjustment be disconnected or made inoperative so that the automatic exposure mechanism or the manual preselection of the diaphragm may operate without difficulties, whereby also the limitation of the distance range be disconnected.

In order to obtain this result, there are arranged disconnecting cams on the inner circumference of the ring 19. These disconnecting cams on one hand engage the free end 67 of the lever 37 and on the other hand engage the upper end 41 of the lever 39. The disconnecting cam which cooperates with the lever end 67 is formed by the last rising portion of the cam 38 which is arranged between the illustrated point of engagement of the lever end 67 and the point 66 on the cam 38 which at 66 reaches its highest point. Upon a rotation of the adjusting ring 19 in counterclockwise direction the lever end 67 is raised with respect to the ratchet cam 129 and is moved away from the same so that an engagement with any one of the steps of the ratchet cam 129 can no longer take place. It is to be noted that in FIG. 1 the actuating ring 19 with its cams is arranged behind the distance adjusting ring 1 and that only the pin 45 which projects from the plane of the distance adjusting ring 1 forms the abutment member for the engagement with the ratchet cam 129.

The adjusting ring 19 is also provided with an additional disconnecting cam 48 which cooperates with the lever 39. The disconnecting cam 48 becomes active when the adjusting ring 19 is rotated counterclockwise and causes the end 41 of the lever 39 to be actuated so that the other lever end 44 which serves as a catch member is moved in clockwise direction in such a manner that the lever end 44 comes to lie above the entire series of abutment steps 5. This assures that when the camera or the camera objective is changed from flash operation to daylight operation neither a limitation of the distance adjusting range nor a limitation of the diaphragm adjustment can take place either by the exposure meter or by hand.

In order to preselect the desired diaphragm aperture in accordance with the selected number of the diaphragm adjusting scale 22, there is provided on the adjusting ring 19 a radially inwardly extending abutment member 24, the distance of which from the uppermost step 68 on the series of abutment steps 5 depends upon which diaphragm number of the scale 22 has been moved opposite the index 21. As shown in FIG. 1, the distance of the arm 24 from the uppermost step 68 of the abutment steps 5 is the greatest when the diaphragm aperture has been adjusted to its smallest size such as $f{:}22$, but when the diaphragm apertures are adjusted to greater sizes, the distance of the abutment member 24 from the step 68 will be decreased. It appears from the foregoing that the diaphragm cage 4 when the diaphragm aperture is adjusted to its smallest size will perform a complete rearward rotation and that the diaphragm will be reduced to its smallest value before the abutment member 24 will engage the step 68. It also should be clear that when the diaphragm aperture has been adjusted to its greatest size $f{:}2$, the abutment member 24 will assume the position with respect to the step 68 as it is shown by the lever end 44 in the FIG. 1. When the parts are arranged in these relative positions, the diaphragm cage 4 has no possibility to perform a rearward rotation when the camera after winding is released and, therefore, the diaphragm remains wide open.

Figure 2:
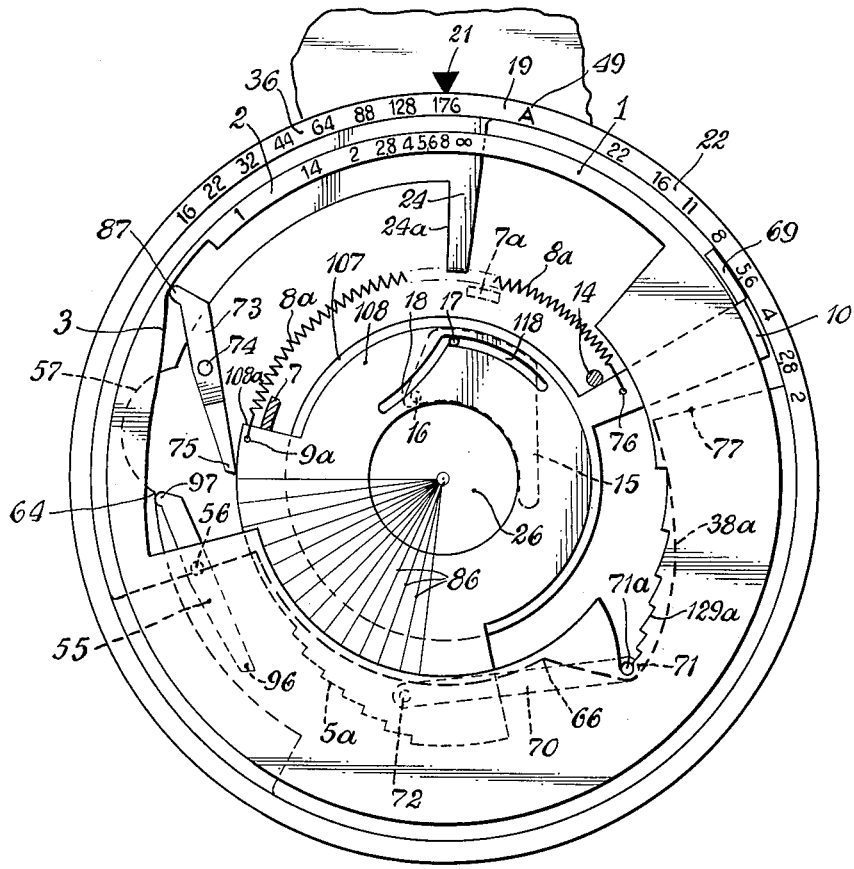
FIG. 2 is a view similar to FIG. 1, but shows a modified construction.

FIG. 2 illustrates another embodiment of the invention in which the same parts as in FIG. 1 are employed and these parts are designated with the same reference characters. The embodiment illustrated in FIG. 2 differs from the one illustrated in FIG. 1 first of all in this that the lever arrangement 37, 39 used in FIG. 1 is not employed for the purpose of distance adjustment and guide number adjustment in the diaphragm mechanism for forming the required size of the diaphragm aperture. Instead, there is employed only a single lever 73 which is controlled in its movement by the cam 3 on the distance adjusting ring 1, whereby the lower end 75 of this lever 73 forms a catch member. The lever 73 engages or traces with its upper end 87 the cam 3 on the distance adjusting ring 1 and is urged in constant engagement with the cam 3 by a not illustrated spring. The pivot axis 74 of this lever 73 is arranged approximately in the center of the same and the lower end 75 of the lever 73 which serves as catch member performs, depending upon the adjusted distance, pivotal movements which adjust the lever 73 to a certain angle of incidence with respect to the series of abutment steps 5 so that the latter will be engaged sooner or later. The lever 73 is influenced by the cam 3 in such a manner that in the illustrated greatest distance of 8 meters for flash exposures this lever 73 has its greatest angle of incidence and its greatest approach to the lowest step, while when the distance is adjusted to low values the lower end 75 of the lever 73 moves stepwise toward the level of the steps and thereby the angle of incidence is being reduced.

Another difference between the embodiment of FIG. 2 and that illustrated in FIG. 1 consists in this that the abutment member for limiting the distance in dependence of the adjusted guide number is formed by a separate distance limiting lever 70 which cooperates with a control cam 38a on the adjusting ring 19. This lever 70 consists of a single arm which at one of its ends is rotatably supported about a stationary axis 72 while the free end 71 of the lever 70 is urged by a not illustrated spring in engagement with the mentioned control cam 38a. This free end 71 is provided with a pin 71a which projects outwardly from the plane of this lever 70 and is used for engaging any one of the steps at the distance limiting ratchet cam 129a which is arranged on the inner circumference of the distance adjusting ring 1. As shown in the drawing, the lever end 71 is pivotally moved by the control cam 38a in dependence of the adjusted guide number so that the lever 70 assumes different angles of incidence with respect to the ratchet cam 129a. The arrangement is such that when high guide numbers are adjusted, the pin 71a engages the corresponding steps on the cam 129a which correspond to greater distances, whereby a portion of the distance range indicating shorter distances is blocked. On the other hand, when lower flash bulb guide numbers are brought in opposition to the index 21, then the pin 71a on the lever 70 engages the steps on the ratchet cam 129a representing shorter distances so that in the extreme case the entire distance range from 8 m. to 1 m. is available for the flash bulb exposures. The pin 71a has to project from the plane of the lever 70 because the adjusting rings 1 and 19 are arranged one next to the other in different planes. In the illustrated embodiment the adjusting ring 19 is arranged in rear of the distance adjusting ring 1.

The embodiment of FIG. 2 discloses a somewhat farther going development than the one shown in FIG. 1 in that FIG. 2 also illustrates a catch member 55 which is operatively connected with an automatic exposure mechanism. This catch member consists of a two armed lever 55 which is fixedly attached with its approximate center portion to a rotatable shaft 56. This shaft 56 performs rotative movements when the automatic mechanism of the camera is used, whereby these rotative movements are derived from a tracing element which performs movements in dependence of the position of the pointer of an exposure meter built into the camera. The lower end 96 of the lever 55 serves as a catch element with respect to a series of abutment steps 5a of the diaphragm mechanism. This series of abutment steps 5a may comprise a common series of abutment steps for an exposure control mechanism which runs off with a camera releasing mechanism. This exposure control mechanism contains a diaphragm mechanism and an exposure time forming mechanism. The other, upper end 97 of the lever 55 is urged by a not illustrated spring into engagement with a cam provided on the inner circumference of the adjusting ring 19. This cam is formed in such a manner that upon employing the flash bulb mechanism the lever 55 is made inactive with respect to the series of abutment steps 5a, while upon employment of the automatic exposure mechanism the lever 55 is made freely movable so that it may follow the movements of the tracing element which derives its movements from the exposure meter. This free movement of the lever 55 upon employing the automatic exposure mechanism of the camera is obtained in that the lever end 97 slides off the cam surface at the point 64 and into a recess 57 which is of such a size that it does not restrict even the greatest pivotal movements of the lever 55 around its axis formed by the shaft 56.

In order to introduce the adjusted distance and guide number values into the diaphragm mechanism for the formation of a suitable size of the diaphragm aperture, there is employed in the embodiment of FIG. 2 a somewhat different procedure than in FIG. 1 in that in place of a single rotatable diaphragm cage 4 there are employed two rotatable diaphragm cages. One rotatable diaphragm cage 108 carries the abutment steps 5a and operates, as already described, in such a manner that the diaphragm aperture is formed in dependence of the distance adjustment by means of the lever 73 and its catch member 75 thereon. The introduction of the guide number values is accomplished by the second rotatable diaphragm cage 107 and is performed in this manner that the second diaphragm cage 107 has arranged thereon an outwardly extending radial control arm 10 which cooperates with an inwardly extending projection 69 on the adjusting ring 19. This radial arm 10 is on one side blocked by a stationary pin 14 and this means that the diaphragm cage 107 can only be rotated in clockwise direction from the position illustrated in FIG. 2. The diaphragm cage 108 is moved by a film advancing and shutter tensioning gearing which moves the operating member 7 when the camera is tensioned into a position which corresponds to the largest diaphgram aperture and in this position it is held until the camera is released. Upon release of the camera, the operating member 7 moves from the position 7 into the position 7a and this results in a release of the diaphragm cage 108 so that it may rotate in clockwise direction. This rearward movement of the cage 108 is caused by the spring 8a, one end of which is attached to a point 9a on the diaphragm cage 108 while the other end is attached to the point 76 on the diaphragm cage 107, or more precisely, on its radial arm 10.

In the position illustrated in FIG. 2 the two diaphragm cages 107 and 108 are arranged in their greatest circumferential distance away from one another and the tension spring 8a has the tendency to rotate the diaphragm cage 108 with respect to the diaphragm cage 107 in clockwise direction. The diaphragm cages 107 and 108 are of course positioned in axial alignment with one another and one behind the other, but for the purpose of making this position clearly visible, the drawing shows these cages as having different diameters.

Figure 3:
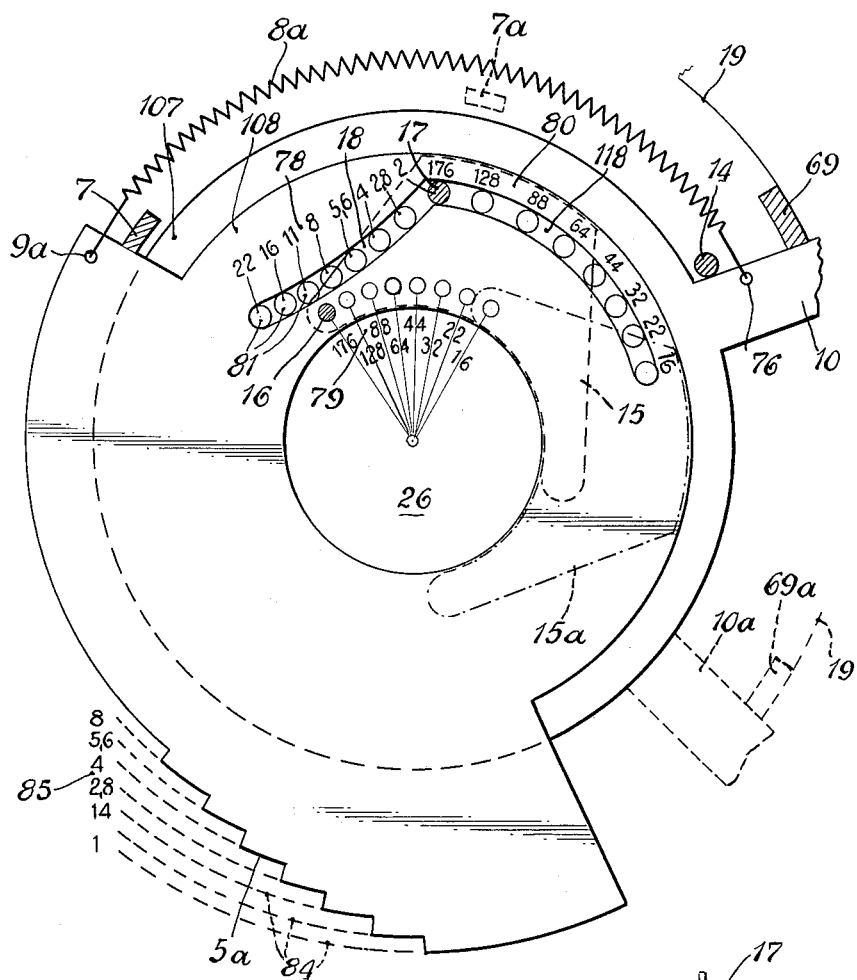
FIG. 3 illustrates an enlarged portion of FIG. 2 with explanatory reference lines and numbers explaining the operation of related parts.
Figure 4:
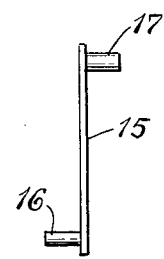
FIG. 4 is an edge view of one of the diaphragm segments.

The diaphragm segments 15 are arranged between these two axially aligned diaphragm cages 107, 108, but for the sake of any easy understanding, the drawing illustrates only a single diaphragm segment 15. The FIGS. 3 and 4 illustrate in somewhat enlarged views the details of these diaphragm cages and the diaphgram segment 15. Each diaphragm segment 15 is provided on one side (FIG. 4) with a control pin 16 and on the other side with a control pin 17 of which the pin 16 is arranged in a suitable bore of the diaphragm cage 107 so that this pin 16 constitutes the axis of rotation of the segment 15. The other pin 17 is movable in a guide slot 18 provided in the diaphragm cage 108. The highest point of the guide slot 18 terminates in a concentric slot portion 118. A movement of the pin 17 within this concentric slot portion 118 takes place when upon selection of a guide number a predetermined rotative adjustment of the diaphragm cage 107 takes place. The concentric slot portion 118 is used solely for storing the respective guide number into the diaphragm mechanism without causing a change in the size the diaphragm aperture.

It has been explained in the foregoing that the diaphragm cage 107 upon a rotation of the adjusting ring 19 within the range of the guide numbers, namely by an adjustment to guide numbers which are smaller than 176, will be rotated by the projection 69 when the latter engages the radial arm 10 and that this rotation takes place in clockwise direction, while on the other hand upon reversing the movement of the guide number selecting device the arm 10 follows the projection 69 as a result of the action of the spring 8a. It has also been pointed out in the foregoing that upon release of the camera the diaphragm cage 108 is permitted to perform a rearward rotation and will be stopped sooner or later by the catch member 75 which is controlled in dependence from the adjusted distance.

In order to explain in what manner the adjusted guide number is introduced by the parts 69 and 10 and in what manner the adjusted distance is introduced by the parts 75 and 5a in accordance with the previously mentioned equation which determines the required diaphragm aperture, and in which manner the employed diaphragm mechanism with the two rotatable diaphragm cages forms the desired diaphragm aperture, the FIG. 3 is provided with a number of explanatory reference characters and explanatory scales. At the lower edge of the diaphragm segment 15 is drawn a row of circles 82 which indicate the various positions assumed by the pin 16 and which of course change the position of the segment 15 correspondingly when the diaphragm cage 107 upon adjustment to a different guide number is rotated. For the purpose of explaining the associated position of the pin and the guide number, there is also shown a guide number scale 79 in FIG. 3. Furthermore, in the guide slot 18 is drawn a row of circles 81 and next thereto is a diaphragm scale 78 which indicates the positions of the pin 17 upon change of the relative position between the diaphragm cages 107 and 108, whereby a corresponding change in the diaphragm aperture takes place. The concentric guide slot portion 118 has drawn therein a row of circles 83 and next thereto is a guide number scale 80 so that upon rotative adjustment of the diaphragm cage 107 in response to changes in the guide number the respective positions of the pin 17 can be understood.

In connection with the series of abutment steps 5a on the diaphragm cage 108 there is inserted a number of concentric dashed lines 84 which are intended to illustrate the individual positions of the catch member 75 in dependence from the distance adjustment. The individual lines 84 have associated therewith for the purpose of understanding the distance adjustment the respective distance numbers (a row of circles 85). Finally, for the purpose of understanding the total rearward movement of the diaphragm cage 108 with respect to the catch member 75, there is shown in FIG. 2 a series of radial lines 86 which are intended to assist in the understanding of the diaphragm formation with respect to the distance adjustment and the guide number value.

FIG. 2 illustrates an extreme position of the guide number 176 and the distance adjustment to 8 m. in which the camera is tensioned and the camera objective is viewed from the front. In this position the front pin 17 and the rear pin 16 are illustrated by circular hatched areas in FIG. 3. A distance smaller than 8 m. is not adjustable since as shown in FIG. 2 the pin 71a on the end 71 of the lever 70 has dropped into the 8 m. step of the distance controlling ratchet cam 129a and as a result, the distance adjusting ring 1 is blocked against rotation. Upon release of the camera the diaphragm cage 108 rotates rearwardly a distance of seven diaphragm intervals, as indicated by the radial interval lines 86, until it reaches the lever end 75 and this results in the formation of the required diaphragm $f{:}22$. The pin 16 remained in its position because the diaphragm cage 107 retained its position. The pin 17, however, has been moved during this rearward movement of the diaphragm cage 108 into the position indicated with 22 in the row of circles 81 (FIG. 3).

It can be assumed now that the distance adjustment remains at 8 m. and that an exposure is to be made with the other extreme guide number 16. This is accomplished by a corresponding rotative adjustment of the operating ring 19 until the guide number 16 is below the index 21. Hereby its projection 69 engages the radial arm 10 of the diaphragm cage 107 and moves the same into the position 10a, 69a shown in dash lines in FIG. 3. The pin 16 moves, of course, with the cage 107 into the position indicated with 16 in the row of circles 82 and therefore the diaphragm segment 15 has been moved in the position indicated in dash lines with 15a. Since now in the assumed tensioned position of the camera the diaphragm cage 108 remains in its blocked position, the pin 17 is moved into the concentric point 118 in the position indicated with 16 in the row of circles 83. The catch member 75 has remained in its 8 m. position.

Upon release of the camera the diaphragm cage 108 returns a distance equal to seven diaphragm intervals until its first step engages the lever end 75. Owing to the pre-run of the diaphragm cage 107, likewise about a distance of seven guide number intervals, the pin 17 moves a distance of seven intervals along the row of circles 83, namely within the entire length of the concentric portion 118 and upon termination of this rearward movement, when the lever end 75 engages the mentioned step on the series of steps 5a, the pin 17 will be in the position shown in a hatchet area at the limit of the concentric portion 118 where it connects with the slot 18. This position is indicated with the diaphragm value 2 and in connection with the previous explanation it is apparent that the diaphragm has remained fully open when the guide number has been adjusted to 16 and the distance to 8 meters. At the same time this practical example makes it clear that in view of the employment of two rotatable diaphragm cages the same abutment position between the parts 5 and 75 does not always result in the same diaphragm size. The abutment position between the lever end 75 in its 8 m. position and the next step in the series of steps 5 may result in the adjustment to different diaphragm apertures depending upon the preselected flash bulb guide numbers.

As another example may be explained the one in which the guide number 16 and the other extreme distance of 1 meter is used. The adjustment or selection to the guide number 16 requires, as explained in the description of the previous example, that the diaphragm segment 15 be pivotally moved into the position 15a shown in FIG. 3. In this position the pin 16 assumes the position 16 as shown in the row of circles 82 and the pin 17 assumes the position 16 in the row of circles 83 and this requires a pre-run of the diaphragm cage 107 about a distance of seven intervals. The lever end 75 receives from the control cam 3 on the distance adjusting ring 1 such a movement that an engagement with only the last step (FIG. 3) of the series of steps 5 on the diaphragm cage 108 takes place. This requires an additional interval during the return movement of the diaphragm cage 108 with respect to the 8 m. position which was previously considered and amounted to six intervals. If now the camera is released and the diaphragm cage 108 is permitted to return, then this return movement is equal to a distance of thirteen intervals until the last step of the series of steps 5a engages the lever end 75 which has been adjusted to a small angle of incidence with respect to the mentioned steps 5a. This means that the pin 17 returns the same amount of intervals, namely seven intervals within the concentric portion 118 and six intervals within the control slot 18. When the parts 75 and 5a meet, the pin 17 has reached the position 16 in the row of circles 81 and this corresponds to the diaphragm aperture f:16.

When the camera or the camera objective, respectively, is switched from the flash range to the range of the automatic exposure, i.e. when the mark 49, namely A, is moved opposite the index 21, the tracer head 97 on the automatic exposure lever 55 will be located in the recess 57 provided in the adjusting ring 19 and, as previously described, this recess 57 is so constructed that the lever 55 may follow all of the movements required by the automatic exposure mechanism. This means that the lever 55 can follow all of the rotative movements transmitted to it by the control shaft 56 and may assume with respect to the abutment steps 5 any desired angle on the basis of which during the return movement of the diaphragm cage 108, which is coupled with the exposure time forming device, it will sooner or later engage a predetermined stop so that proper exposure speeds and diaphragm apertures are formed.

The lever 73 which is controlled in its movement by the adjusting cam 3 on the distance adjusting ring 1 does not require any disconnection by a disconnecting cam on the operating ring 19, since it is circumferentially displaced with respect to the lever 55 in such a manner that it will become inactive during the automatic exposure operation. The operating range of the diaphragm cage 108 is at the most seven diaphragm intervals in clockwise direction when the automatic exposure device is used and the diaphragm cage 108 is in the illustrated locked position. Even when the lever 73 has been adjusted to infinity and the diaphragm has been adjusted to f:22 for automatic exposure operation, it is only possible that the lever end 75 and the part 62 come at the same time into engagement with relation to the steps 5 whereby the lever end 96 engages the last step and the lever end 75 engages the first step on the steps 5. The adjustment of the diaphragm will hereby not be disturbed.

It is desired to point out also that during the automatic exposure operation and also in the range of the still to be described manual adjustment of the diaphragm or its preselection the second diaphragm cage 107 remains stationary. In these ranges no guide numbers are to be stored because the respective element on the operating ring 19, namely the projection 69, has been moved away from the arm 10 of the diaphragm cage 107 when the operating ring 19 has been moved away from the flash range so that the camera is now adjusted either to an automatic exposure operation or to a manual diaphragm adjustment. The adjustment of the diaphragm in the last two ranges takes place only during the adjustment of the diaphragm cage 108 and effects an adjustment of the lever end 96 or of the preselection abutment 24 with respect to the steps 5.

For a disconnection of the distance limitation is used the disconnecting cam 38a on the abutment ring 19. The cam 38a cooperates with the lever end 71 which also carries the catch pin 71a for cooperation with the ratchet cam 129. This catch pin 71a is raised above the level of the ratchet cam 129 to the highest point 66 of the cam 38a and is maintained in this high position. Therefore, the camera user is able to choose any desired distance adjustment within the range of the automatic exposure device and within the range of the manual diaphragm selection. An operation of the control arm 10 by the radial edge 77 on the adjusting ring 19 is not possible since the edge 77 is arranged in another plane.

Figure 6:
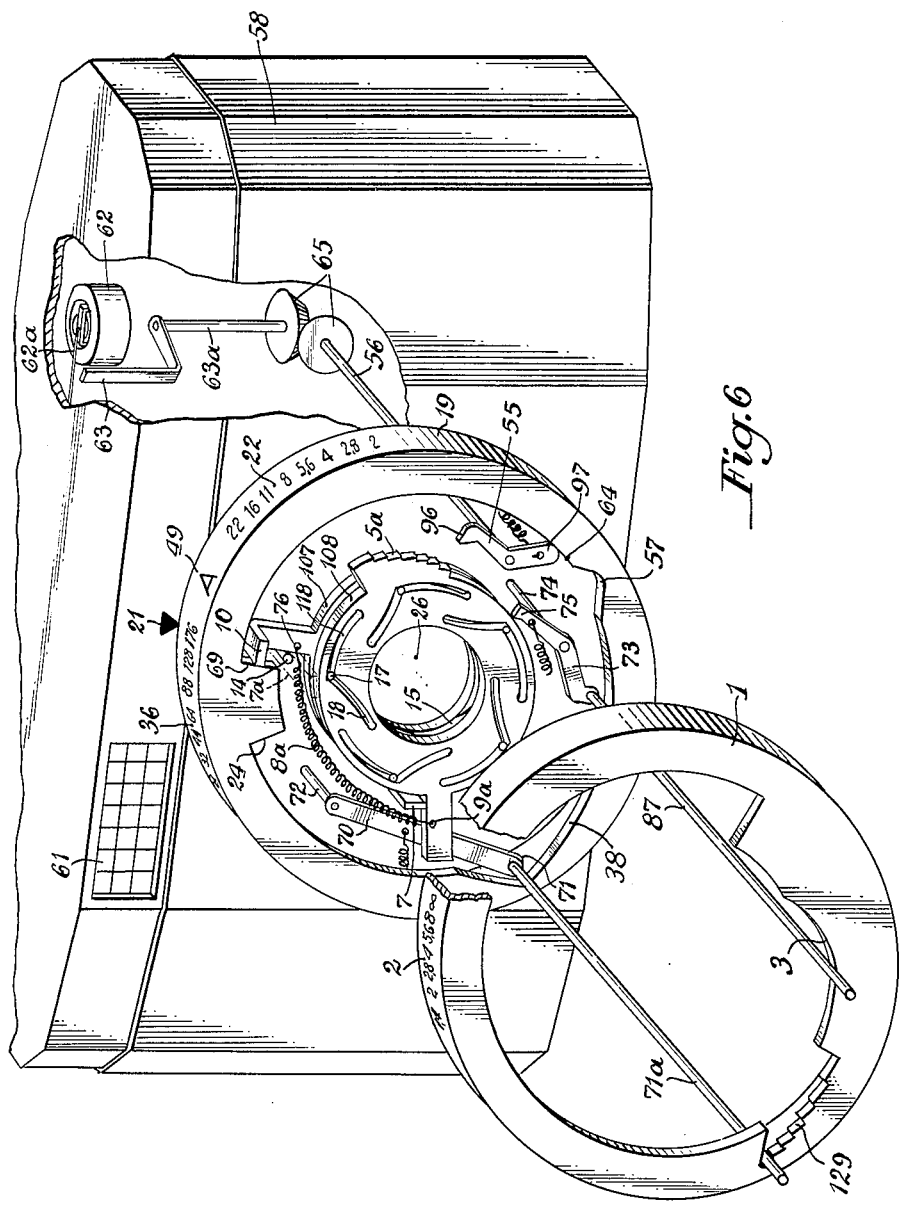
FIG. 6 illustrates an exploded perspective view of a photographic camera embodying the structure of the invention shown in FIG. 2.

The operation of the control elements arranged between the various rings, levers and the like which are positioned one above the other in different planes takes place always by means of outwardly bent ears, reinforced walls, projecting pins and the like, as will be apparent from the perspective illustrations of the invention as shown in the FIGS. 5 and 6.

A still further rotative adjustment of the adjusting ring 19 in a counterclockwise direction in such a manner that one value of the diaphragm scale 22 comes to lie below the index 21 has the result that the preselector abutment 24 with its abutment edge 24a comes into the range covered by the diaphragm numbers. An engagement of the abutment 24 with the front abutment face 108a on the diaphragm cage 108 takes place depending upon the selected diaphragm number and the position of the abutment 24. Therefore, the diaphragm cage 108 performs upon a release of the camera a shorter or longer return movement and immediately before the exposure takes place the diaphragm is adjusted to the selected value as indicated by the diaphragm scale.

FIG. 5 illustrates in a perspective and exploded view a photographic camera which employs the embodiment of the invention illustrated in FIG. 1. In FIG. 5 the same parts which also appear in FIG. 1 are provided with the same reference characters. In addition thereto, FIG. 5 shows the camera casing 58 having built into the same a photoelectric cell 61 and a few additional parts as will be described hereinafter. The diaphragm cage 4 is provided with the series of abutment steps 5 for the flash bulb mechanism and with additional abutment steps 54 which cooperate with the automatic exposure mechanism. The abutment steps 54 are adapted to be engaged by the end 96 of the lever 55 which is mounted on the shaft 56 adapted to be rotated by the measuring instrument 62 of the exposure meter. For this purpose a rotatable part 62a on the measuring instrument 62 is provided with a non-circular circumference which is engaged by a tracer member 63 arranged on a vertical shaft 63a which rotates a bevel gearing 65 which in turn rotates the horizontal shaft 56. When the measuring instrument pointer 62a rotates, it rotates also the non-linear part 62a of the measuring instrument 62. There are also used clamping devices for the pointer 62a of the measuring instrument, but since these parts do not belong directly to the invention, they are not illustrated. For the understanding of the automatic exposure device and the additional flash bulb mechanism of the invention it is sufficient to point out that the shaft 56 to which the lever 55 is attached is directly rotated by the movable measuring instrument of the exposure meter so that the end 96 of the lever 55 is moved toward the abutment steps 54 or away from the same. This movement of the lever 55 takes place in dependence of the measured amount of light which energizes the photoelectric cell 61 when the camera is released so that the diaphragm cage 4 performs a longer or shorter return movement and in connection with the not illustrated shutter speed control ring performs a movement which opens and closes the diaphragm in accordance with the shutter speed which is used.

The other end 97 of the lever 55 attached to the shaft 56 is in engagement with the inner edge 64 of the adjusting ring 19 which is used for changing the operating range of the camera selectively to flash bulb operation, automatic exposure operation and manual diaphragm preselection. The inner edge 64 of the ring 19 constitutes a disconnecting cam for the lever 55 and therewith for the automatic exposure device. As shown in FIG. 5, the adjusting ring 19 has been adjusted to flash bulb operation in which the range of the flash bulb guide number is opposite the stationary index 21. In this position the end 97 of the lever 55 engages the inner edge 64 of the ring 19 and as a result the lever 55 has been moved outside of the range of the abutment steps 54. However, as soon as the adjusting ring 19 is moved with its index 49, namely with the letter A, in alignment with the stationary index 21, the camera is adjusted for automatic exposure operation because then the end 97 of the lever 55 is moved into a recess 57 on the inside of the adjusting ring 19 and the lever 55 is now able to perform its function and may be brought into engagement with any one of the steps 54. At the same time, the flash bulb operating mechanism is rendered inoperative.

For the disconnection of the flash bulb mechanism is used the disconnecting cam 48 on the adjusting ring 19. This disconnecting cam 48 is illustrated in the FIGS. 1 and 5 and cooperates with a horizontal control rod 59 which is attached to the end 41 of the lever 39. The distance limiting ratchet cam 129 as shown in FIG. 5 is provided on a separate sector shaped plate 90 which is provided with bores 90a and 90b for the attachment of this plate 90 by means of screws or the like to the distance adjusting ring 1 which for this purpose is provided with threaded bores 88 and 89, respectively.

FIG. 5 also shows that the adjusting ring 19 is provided with the disconnecting edge 64 for the automatic exposure device. In addition, the adjusting ring 19 is provided with the control cam 38 for the operation of the lever 39 which is operated when the camera objective is adjusted for different guide numbers so that an adjustment of the lever 39 takes place with respect to the abutment steps 5. The second, stationary diaphragm cage of the diaphragm is designated with 53 in FIG. 5 and there are also shown springs 52 and 60 which urge the levers 37 and 39, respectively, against their control cams 38 and 3, respectively.

FIG. 6 illustrates in an exploded and perspective view a photographic camera which employs the embodiment of the invention illustrated in the FIGS. 2 and 3. A detailed description of this FIG. 6 appears to be not necessary because the details of the same correspond very closely to the details illustrated in FIG. 3 and the various parts are provided with the same reference characters. Furthermore, this view is very similar to the FIG. 5, except that the circumferential position of the levers 55, 70 and 73 is somewhat different. The camera casing 58 and the arrangements of the photo-electric cell 61 and the measuring instrument 62 are the same.

Figure 7:
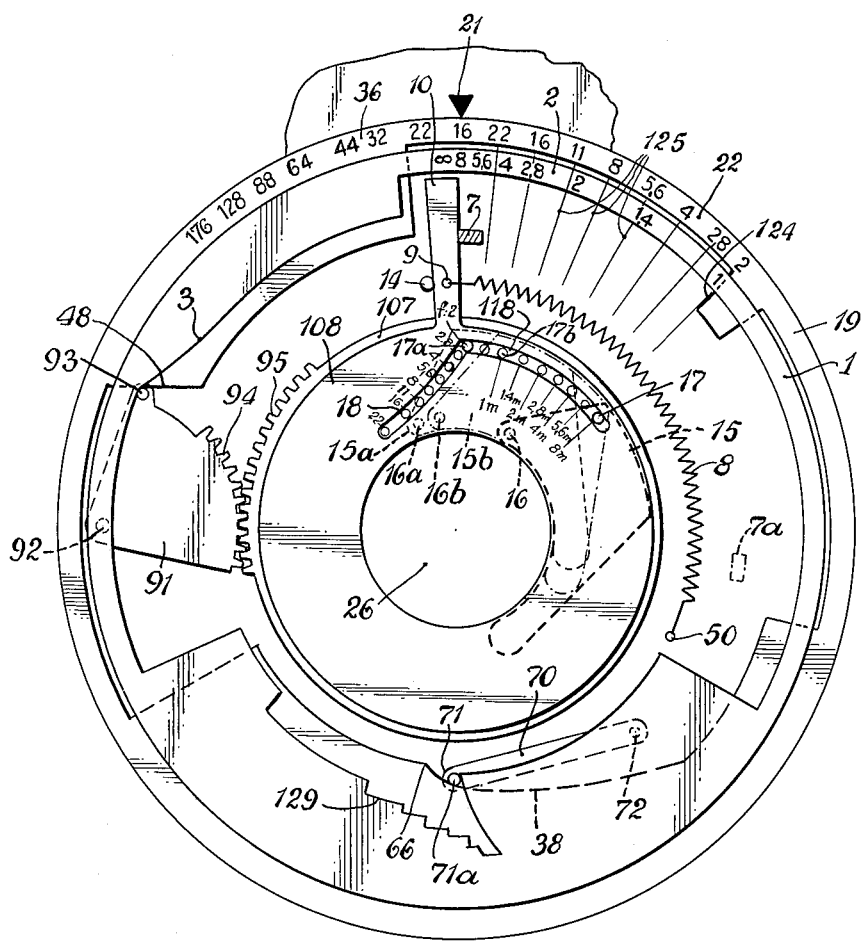
FIG. 7 illustrates a view similar to FIG. 1, but shows still another modified construction.

The embodiment of the invention as shown in FIG. 7 is particularly intended for such cameras and camera objectives which are not equipped with an automatic exposure device. Therefore, there is merely used a range for the flash bulb mechanism and a range for the manual diaphragm selection or diaphragm preselection. Accordingly, the ring 19 which is adjustable with respect to the stationary index 21 is provided solely with a guide number scale 36 and in connection therewith with a diaphragm scale 22. A further difference of the embodiment illustrated in FIG. 7 compared with the ones shown in the FIGS. 1 to 6 consists in this that the guide number values and distance values are introduced in a different manner into the diaphragm mechanism which is provided with two rotatable diaphragm cages 107 and 108. The distance value is no longer introduced by means of a pivotally mounted lever with a catch member thereon, but in place thereof is employed a rotatable sector 91 which is rotatably mounted about a stationary axis 92. This sector 91 is provided with a tracer pin 93 and a toothed segment 94. The tracer pin 93 is urged by a not illustrated spring into engagement with the control cam 3 on the distance adjusting ring 1 while the toothed segment 94 meshes with a toothed segment 95 which is arranged concentrically on the rotatable diaphragm cage 107. The cam 3 on the distance adjusting ring is constructed in such a manner that the sector 91 is rotated with increasing speed in clockwise direction the smaller the distance values are to which the ring 1 is adjusted. Correspondingly, the diaphragm cage 107 is rotatably adjusted in a counterclockwise direction.

The introduction of the adjusted guide number into the second, rotatable diaphragm cage 108 for the purpose of forming the required diaphragm aperture takes place in this manner that the diaphragm cage 108 is provided as heretofore with a radially extending arm 10 which cooperates with an abutment member 124 provided on the inner circumference of the adjusting ring 19. The diaphragm cage 108 is pretensioned by a spring 8, one end of which is attached to a pin 9 on the radial arm 10 while the other end of the spring 8 is attached to a stationary pin 50. In the tensioned condition of the camera the diaphragm cage 108 is prevented from clockwise movement by an operating member 7 which is actuated by the shutter tensioning device and is in the position shown in solid lines when the shutter is tensioned. Upon release of the shutter, however, the operating member 7 jumps into the position illustrated in dash and dotted lines 7a so that the diaphragm cage 108 is free to return until its arm 10 engages the abutment 124.

In FIG. 7 is illustrated only one of the diaphragm segments 15 which in the same manner as shown in FIG. 4 are provided on one side with a pin 16 which engages a suitable bore of the diaphragm cage 107, while on the other side of the segment 15 a pin 17 is arranged which moves in the control slot 18 of the diaphragm cage 108 and is also movable in the concentric continuation 118 of this slot. The concentric portion 118 serves for storing the introduced distance values during a rotation of the diaphragm cage 107 which causes a change in the position of the pin 17 within the concentric extension 118. For the purpose of illustrating the different positions of the pin 17 upon the adjustment of the distance values, there are shown a series of small circles to which are assigned the corresponding distance values. This means that by a rotation of the diaphragm cage 107 for adjusting the camera to smaller distances a displacement of the diaphragm segment 15 takes place about the light passage opening 26 and in this displacement the pin 17 moves within the concentric portion 118 until it reaches the position indicated with 1 m. without causing a closing of the diaphragm. The movement of the segment 15 in this sense may, as will be explained later, go beyond this point without causing any change in the fully open diaphragm. The pin 17 may reach the very end of the concentric portion 118 which is designated with f:2 and constitutes a high point of the control slot 18. Only when the pin 17 enters the control slot 18 a stepwise closing of the diaphragm takes place. This occurs when a higher guide number is adjusted or when a diaphragm aperture is chosen which deviates from f:2.

As an example for forming a diaphragm aperture in the flash bulb range it may be assumed that the guide number 16 and the distance of 8 m. have been adjusted. When the camera is tensioned, the diaphragm segment 15 assumes the illustrated position in which the control pin 17 is at the end of the concentric portion 118 at the distance point indicating 8 m. Upon release of the camera the spring 8 becomes effective and causes the diaphragm cage 108 to rotate in clockwise direction. When the arm 10 has moved from the illustrated position to the position where it engages the abutment 124, the diaphragm cage 108 has moved eight diaphragm intervals and this is illustrated for a better understanding of the invention by the radial interval lines 125 in FIG. 7. The pin 17 therefore has been moved within the concentric portion 118 a corresponding number of intervals and has reached the position indicated with 2 where the connection with the control slot 18 takes place. This means that at the adjusted guide number 16 and the adjusted distance of 8 m. the required diaphragm aperture has been formed automatically.

As another example may be assumed that the objective has been adjusted to a guide number 16 and a distance of 1 m. The sector 91 during this adjustment has rotated the diaphragm cage 107 a distance equal to 6 intervals so that the diaphragm segment 15 is moved into the position 15b in which the pin 16 assumes the position 16b. The pin 17, however, has been moved in the concentric portion 118 of the stationary diaphragm cage 108 a distance rearwardly and this distance corresponds to six intervals and the pin 17 therefore is now in the position of 1 m. indicated by 17b. If the camera is now released, then the diaphragm cage 108 has to be moved again a distance of eight intervals since the guide number 16 remains unchanged. This has the result that the pin 17 after passing through the same number of intervals will assume the position indicated with 16 in the control slot 18 and this means that the diaphragm has been closed down to the smallest aperture.

Other possible adjustments may easily be understood from the examples just described. This makes it clear that when the distances are adjusted to smaller values, the pin 17 performs a greater approach to the control slot 18 which means that the pre-run of the diaphragm will become progressively smaller and that for the purpose of forming the diaphragm aperture the pin 17 moves the deeper into the control slot 18 the higher the selected guide number is going to be. This is due to the fact that the abutment 124 moves away from the radial arm 10 and the rearward movement of the diaphragm cage becomes greater the higher the guide number has been adjusted.

When the camera is changed from making flash bulb exposures to daylight exposures for which latter operation a manual adjustment of the diaphragm takes place the diaphragm cage 107 as a result of the engagement of the tracer pin 93 of the sector 91 with the disconnecting cam 48 on the adjusting ring 19 is rendered stationary.

The sector 91 as the result of the action of the disconnecting cam 48 is rotated in clockwise direction such a distance that the diaphragm cage 107 makes the corresponding movement in the opposite direction so that the diaphragm segment 15 is moved into the position 15a. In this position the pin 16 assumes the position 16a and the pin 17 assumes the position 17a. The diaphragm cage 107 is kept stationary in this position and is no longer used for the formation of the diaphragm aperture. The further change of the diaphragm aperture is solely effected by the diaphragm cage 108, the rearward movement of which is determined by the position of the abutment 124 whereby the starting point of the pin 17 is no longer along a point of the concentric portion 118 but is located within the range of the control slot 18, namely at the point 17a. Accordingly, the diaphragm mechanism has been changed to a conventionally operating spring diaphragm mechanism.

What I claim is:

1. A photographic camera designed for selectively making flash bulb exposures and daylight exposures, said camera comprising in combination:
    (a) a photographic objective provided with an adjustable diaphragm,
    (b) an automatic diaphragm adjusting means,
    (c) a manual diaphragm adjusting means,
    (d) a distance adjusting means,
    (e) a flash bulb range with a guide number adjusting means operable in dependence of said distance adjusting means,
    (f) means arranged between said guide number adjusting means and said distance adjusting means for limiting the range of said distance adjusting means in dependence of the adjusted guide number,
    (g) means for operating said automatic diaphragm adjusting means in dependence of said guide number adjusting means for adjusting said diaphragm to a size corresponding to the adjusted guide number and adjusted distance, and
    (h) means operated by said guide number adjusting means when the latter is moved outside said flash bulb range for disconnecting said automatic diaphragm adjusting means and said means limiting the range of said distance adjusting means and for rendering operative said manual diaphragm adjusting means.

2. A photographic camera, particularly a single lens mirror reflex camera, designed for selectively making flash bulb exposures and daylight exposures, said camera comprising in combination:
    (a) a photographic objective provided with an adjustable spring operated diaphragm,
    (b) an automatic diaphragm preselecting means,
    (c) a manual diaphragm preselecting means,
    (d) a distance adjusting means,
    (e) a flash bulb range with a guide number adjusting means operable in dependence of said distance adjusting means,
    (f) means arranged between said guide number adjusting means and said distance adjusting means for limiting the range of said distance adjusting means in dependence of the adjusted guide number,
    (g) means for operating said automatic diaphragm preselecting means in dependence of said guide number adjusting means for adjusting the aperture of said diaphragm to a size corresponding to the adjusted guide number and adjusted distance, and
    (h) means operated by said guide number adjusting means when the latter is moved outside said flash bulb range for disconnecting said automatic diaphragm preselecting means and said means limiting the range of said distance adjusting means and for rendering operative said manual diaphragm preselecting means.

3. A photographic camera as claimed in claim 2, in which said spring diaphragm is provided with two coaxially arranged rotatable diaphragm cages and diaphragm segments between the same, one of said diaphragm cages being controlled in its rotative movement by said guide number adjusting means and the other diaphragm cage being controlled in its rotative movement by said distance adjusting means.

4. A photographic camera as claimed in claim 2, in which said spring diaphragm is provided with two coaxially arranged rotatable diaphragm cages and diaphragm segments between the same, one of said diaphragm cages being controlled in its rotative movement by said guide number adjusting means and the other diaphragm cage being controlled in its rotative movement by said distance adjusting means, said first named diaphragm cage being rotatably adjusted in one direction by said guide number adjusting means when the camera is tensioned prior to making an exposure, means for blocking said other diaphragm cage in this tensioned position of the camera, means for releasing said other diaphragm cage for a return movement when the camera is released, and a pivotally mounted lever adjusted by said distance adjusting means to a positon in which it stops said return movement of said other diaphragm cage in a position of the preselected diaphragm aperture.

5. A photographic camera as claimed in claim 2, in which said spring diaphragm is provided with two coaxially arranged rotatable diaphragm cages and diaphragm segments between the same, one of said diaphragm cages being controlled in its rotative movement by said guide number adjusting means and the other diaphragm cage being controlled in its rotative movement by said distance adjusting means, each one of said diaphragm segments being provided with two pins thereon which extend outwardly from opposite sides, one of said pins being rotatably supported in a bore of one of said diaphragm cages and the other pin extending into a control slot in said other diaphragm cage, said control slot merging into a concentric extension of said slot which extension causes the diaphragm aperture to remain fully open when said pin enters the same.

6. A photographic camera as claimed in claim 2, in which said spring diaphragm is provided with two coaxially arranged rotatable diaphragm cages and diaphragm segments between the same, one of said diaphragm cages being controlled in its rotative movement by said guide number adjusting means and the other diaphragm cage being controlled in its rotative movement by said distance adjusting means, and a spring which connects the two rotatable diaphragm cages with one another and which is tensioned when the camera is wound prior to making an exposure.

7. A photographic camera, particularly a single lens mirror reflex camera, designed for selectively making flash bulb exposures and daylight exposures, said camera comprising in combination:
 (a) a photographic objective provided with an adjustable spring operated diaphragm,
 (b) an automatic diaphragm preselecting means,
 (c) a manual diaphragm preselecting means,
 (d) a distance adjusting means,
 (e) a flash bulb range with a guide number adjusting means operable in dependence of said distance adjusting means,
 (f) means arranged between said guide number adjusting means and said distance adjusting means for limiting the range of said distance adjusting means in dependence of the adjusted guide number,
 (g) means for operating said automatic diaphragm preselecting means in dependence of said guide number adjusting means for adjusting the aperture of said diaphragm to a size corresponding to the adjusted guide number and adjusted distance,
 (h) means operated by said guide number adjusting means when the latter is moved outside said flash bulb range for disconnecting said automatic diaphragm preselecting means and said means limiting the range of said distance adjusting means and for rendering operative said manual diaphragm preselecting means,
 (i) said guide number adjusting means comprising a movable member provided with a guide number scale,
 (j) said distance adjusting means comprising another movable member provided with a distance scale, and
 (k) a single stationary index with respect of which both of said movable members are adjustable independently of one another.

8. A photographic camera designed for selectively making flash bulb exposures and daylight exposures, said camera comprising in combination:
 (a) a photographic objective provided with an adjustable diaphragm,
 (b) an automatic diaphragm adjusting means,
 (c) a manual diaphragm adjusting means,
 (d) a distance adjusting means,
 (e) a flash bulb range with a guide number adjusting means operable in dependence of said distance adjusting means,
 (f) means arranged between said guide number adjusting means and said distance adjusting means for limiting the range of said distance adjusting means in dependence of the adjusted guide number,
 (g) means for operating said automatic diaphragm adjusting means in dependence of said guide number adjusting means for adjusting said diaphragm to a size corresponding to the adjusted guide number and adjusted distance,
 (h) means operated by said guide number adjusting means when the latter is moved outside said flash bulb range for disconnecting said automatic diaphragm adjusting means and said means limiting the range of said distance adjusting means and for rendering operative said manual diaphragm adjusting means,
 (i) said guide number adjusting means comprising a rotatable ring provided with a guide number scale,
 (j) said distance adjusting means comprising another rotatable ring provided with a distance scale, both said rings extending concentrically about the optical axis of said camera, and
 (k) a single stationary index with respect of which both said rings are rotatably adjustable independently of one another.

9. A photographic camera as claimed in claim 8, in which said means for limiting the range of said distance adjusting means include a pivoted lever the pivotal movement of which is controlled by a cam on said guide number adjusting ring and a distance controlling cam ratchet on said distance adjustment ring adapted to be engaged by said pivoted lever.

10. A photographic camera as claimed in claim 8, including a diaphragm provided with two axially aligned diaphragm cages and diaphragm segments between the same, an outwardly extending arm on one of said diaphragm cages, and an abutment on the inner circumference of said ring provided with the guide number scale for engaging said arm and rotatably adjusting said diaphragm scale.

11. A photographic camera as claimed in claim 8, including a diaphragm provided with two axially aligned diaphragm cages and diaphragm segments between the same, an outwardly extending arm on one of said diaphragm cages, an abutment on the inner circumference of said ring provided with the guide number scale for engaging said arm and rotatably adjusting said diaphragm scale, said other rotatable diaphragm cage being provided with a series of abutment steps, and a pivotally mounted lever controlled by an automatic exposure device and adapted to engage said abutment steps.

12. A photographic camera as claimed in claim 8, in which said distance adjusting ring is provided with a control cam and that said diaphragm is provided with a rotatable diaphragm cage provided with gear teeth, and a pivotally mounted gear sector meshing with said gear teeth on said diaphragm cage and adjusting the latter when said control cam on said distance adjusting ring operates said gear sector.

13. A photographic camera as claimed in claim 8, in which said distance adjusting ring is provided with a control cam and that said diaphragm is provided with a rotatable diaphragm cage provided with gear teeth, a pivotally mounted gear sector meshing with said gear teeth on said diaphragm cage and adjusting the latter when said control cam on said distance adjusting ring operates said gear sector, and a second spring tensioned diaphragm cage which is maintained stationary when the camera is tensioned and is provided with a radial projection which upon release of the camera and return movement of said diaphragm cage cooperates with an abutment on said adjusting ring having the guide number scale thereon and thereby introduces the guide number into the diaphragm adjustment.

14. A photographic camera as claimed in claim 13, in which said abutment on said adjusting ring limits the rotative movement of said second diaphragm cage when the camera is adjusted for manually set daylight exposures.

15. A photographic camera designed for selectively making flash bulb exposures and daylight exposures, said camera comprising in combination:
 (a) a photographic objective provided with an adjustable diaphragm,
 (b) an automatic diaphragm adjusting means,
 (c) a manual diaphragm adjusting means,
 (d) a distance adjusting means,
 (e) a flash bulb range with a guide number adjusting means operable in dependence of said distance adjusting means,
 (f) means for limiting the range of said distance adjusting means in dependence of the adjusted guide number.
 (g) means for operating said automatic diaphragm adjusting means in dependence of said guide number adjusting means for adjusting said diaphragm to a size corresponding to the adjusted guide number and adjusted distance,
 (h) means operated by said guide number adjusting means when the latter is moved outside said flash bulb range for disconnecting said automatic diaphragm adjusting means and said means limiting the range of said distance adjusting means and for rendering operative said manual diaphragm adjusting means,
 (i) said guide number adjusting means comprising a rotatable ring provided with a guide number scale,
 (j) said distance adjusting means comprising another rotatable ring provided with a distance scale, both said rings extending concentrically about the optical axis of said camera,
 (k) a single stationary index with respect of which both said rings are rotatably adjustable independently of one another, and
 (l) control means on the inner circumference of said rings for operating said automatic diaphragm adjusting means and said means for limiting the range of said distance adjusting means, respectively.

16. A photographic camera as claimed in claim 15, in which said control means on the inner circumference of said rings comprise a cam on each said rings and two levers pivotally connected with each other between their ends, one of said levers engaging one of said cams and the other lever engaging the other one of said cams, a rotatable diaphragm cage provided with a series of abutment steps adapted to be engaged by the lever controlled by the cam on the distance adjusting ring, and a ratchet cam on said distance adjusting ring adapted to be engaged by the lever controlled by the cam on the adjusting ring provided with said guide number scale.

17. A photographic camera as claimed in claim 15, in which said control means on the inner circumference of said rings comprise a cam on each said rings and two levers pivotally connected with each other between their ends, one of said levers engaging one of said cams and the other lever engaging the other one of said cams, a rotatable diaphragm cage provided with a series of abutment steps adapted to be engaged by the lever controlled by the cam on the distance adjusting ring, and a ratchet cam on said distance adjusting ring adapted to be engaged by the lever controlled by the cam on the adjusting ring provided with said guide number scale, said abutment steps and said ratchet cam are provided with radial abutment shoulders.

18. A photographic camera as claimed in claim 15, in which said control means in the inner circumference of said rings comprise a cam on each said rings and two levers pivotally connected with each other between their ends, one of said levers engaging one of said cams and the other lever engaging the other one of said cams, a rotatable diaphragm cage provided with a series of abutment steps adapted to be engaged by the lever which is controlled by the cam on the distance adjusting ring, a ratchet cam on said distance adjusting ring adapted to be engaged by the lever controlled by the cam on the adjusting ring provided with said guide number scale, and including a spring connected to said rotatable diaphragm cage, said spring being tensioned when the diaphragm cage is rotated when the camera is tensioned prior to making an exposure, whereby said diaphragm cage is moved into a position in which the diaphragm is fully open, one of said levers upon release of the camera and upon return rotation of said diaphragm cage stopping the latter in a preselected position, while the other lever engages one step of said ratchet cam and blocks a predetermined distance range which is outside the range to which the diaphragm has been adjusted by said return movement of said diaphragm cage.

19. A photographic camera, particularly a single lens mirror reflex camera designed for selectively making flash bulb exposures, automatic daylight exposures and manually set daylight exposures, said camera comprising in combination:
 (a) a photographic objective provided with
 (b) an adjustable diaphragm,
 (c) a diaphragm preselecting means,
 (d) a manual diaphragm adjusting means,
 (e) a distance adjusting means,
 (f) an automatic exposure device,
 (g) a flash bulb guide number adjusting means operable in dependence of said distance adjusting means,
 (h) means for limiting the range of said distance adjusting means in dependence of the adjusted guide number,
 (i) an automatic diaphragm adjusting means operated in dependence of said guide number adjusting means for adjusting said diaphragm to a size corresponding to the adjusted guide number and adjusted distance, and
 (j) means operated by said guide number adjusting means when the latter is moved outside the range indicating flash bulb exposures for disconnecting said means for limiting the range of said distance adjusting means and for selectively rendering operative said automatic exposure device and said manual diaphragm adjusting means.

20. A photographic camera as claimed in claim 19, in which said guide number adjusting means comprises a rotatable adjusting ring extending concentrically around the optical axis of the camera and is provided with a circumferentially extending flash bulb guide number scale, an index indicating automatic exposure operation, and another circumferentially extending diaphragm aperture scale, said distance adjusting means comprising a distance adjusting ring arranged in coaxial relation to said adjusting ring and having a distance scale thereon, and a common stationary index mark relative to which both said rings are adjustable.

21. A photographic camera as claimed in claim 19, in which said guide number adjusting means comprises a rotatable adjusting ring extending concentrically around the optical axis of the camera and is provided with a circumferentially extending flash bulb guide number scale, an index indicating automatic exposure operation, and another circumferentially extending diaphragm aperture scale, said distance adjusting means comprising a distance adjusting ring arranged in coaxial relation to said adjusting ring and having a distance scale thereon, a common stationary index mark relative to which both said rings are adjustable, disconnecting cams on said adjusting ring and pivotally mounted levers actuated by said cams for selectively rendering inoperative said flash bulb operation, automatic exposure device and said means for limiting the range of said distance adjusting means.

22. A photographic camera as claimed in claim 19, in which said guide number adjusting means comprises a rotatable adjusting ring which extends concentrically about said diaphragm provided with a rotatable diaphragm cage, said adjusting ring having an inwardly extending projection which upon adjustment of the camera to manually set daylight exposure engages an abutment face on said diaphragm cage for adjusting the same when the diaphragm aperture is changed.

References Cited by the Examiner

UNITED STATES PATENTS

| | | | |
|---|---|---|---|
| 2,965,011 | 12/60 | Rentschler | 95—64 |
| 2,974,576 | 3/61 | Hahn | 95—64 |
| 2,993,422 | 7/61 | Rentschler | 95—64 X |
| 2,999,439 | 9/61 | Nerwin et al. | 95—64 X |

NORTON ANSHER, *Primary Examiner.*

D. B. LOWE, *Examiner.*